Patented Sept. 27, 1949

2,482,978

UNITED STATES PATENT OFFICE 2,482,978

METHOD OF MAKING COATED STEEL WIRE

Antonio F. Ilacqua and John F. Occasione, Cleveland, Ohio, assignors to The American Steel and Wire Company of New Jersey, a corporation of New Jersey No Drawing. Application August 20, 1945, Serial No. 611,701

2 Claims. (Cl. 148—12)

This invention relates to methods of making coated wire of high tensile strength, toughness, and ductility, coupled with resistance to corrosion such as used for the high speed stitching of layers of components of metals or other materials for various fabricated structures such as aircraft, aircraft parts, non-stressed glider parts, and the like.

This application is a continuation-in-part of application Serial No. 528,654, filed March 29, 1944, now abandoned. The product is covered in a second continuation-in-part application, Serial No. 611,700, filed the same date as the present application.

Coated steel wire for stitching metals is not new but has been used for several years in the automotive and book binding industries. Wire stitching of aircraft parts is a new development. It calls for an unusual combination of properties in the wire that even the highest tensile wire used in normal metal stitching does not adequately meet.

The wire for aeronautical stitching must be hard enough to penetrate substantial thickness of the various materials used in aircraft construction, yet it must be capable of being bent over sharp right angles to insure a complete contact between every portion of the formed staple and the base metal. The wire too must have high resistance to shear, must resist vibratory stresses, and must withstand the corrosive conditions met in flying service.

Coated wire used in normal metal stitching has lacked the high tensile strength, toughness, ductility, and corrosion resistance required in present day commercial stitching machines wherein substantial thicknesses of various materials such as structural steels, stainless steels, soft and tempered aluminum, sometimes combined with solid and veneered wood, plastics, paper, asbestos sheets and the like, must be fastened together.

Stitching wire made by prior practices has been unsatisfactory in that when sufficient coating material was applied to the wire to provide satisfactory resistance to corrosion the wire lacked the proper tensile strength, toughness and penetrating power required for stitching layers of substantially thick metal components, and when such coated wire was cold worked such as by drawing after coating in order to increase the tensile strength and other physical properties necessary for penetrating power, the thickness of the coating was reduced to such a point that it would have too low a rating in the salt spray test and in addition the ductility of the wire would be reduced to the point where it could not be bent flat upon itself without cracking the surface of the wire and the coating thereon. Such coated wires which have had high tensile strength qualities have been deficient in resistance to corrosion in that their coatings would only withstand 75 to 100 hours in the salt spray test.

Coated wire made by prior methods for use in normal stitching operations did not have the proper combined chemical, physical and corrosive resistance qualities and therefore failed to give the performance required in coated wires for present day commercial stitching machines. It has been discovered that when the components of the steel core, particularly the carbon, manganese, and sulphur, are not kept within prescribed limits it will be impossible to correlate the tensile strength, toughness, ductility and corrosion resistance with each other so as to maintain consistent performance in a coated wire for stitching substantial thickness of metal components. When a coated wire having the core or base metal formed from steel of improper analysis is used for stitching metal a tearing puncture in the metal component will result which will leave a burr around the hole with the further result that the coating on the wire may be stripped off to such an extent as to leave the stitch wire bare thereby offering no resistance to corrosion.

Coated wire made by conventional processing methods often has defects which result in frequent fractures and unsatisfactory performance. Such defects are caused by the use of improper steel or the use of unsuitable wire processing practice or a combination of both.

An object of the invention is to provide a method of making a steel wire of great strength, toughness and ductility having a surface which is highly resistant to oxidation or other corrosive action due to ordinary conditions of exposure.

A further object of the invention is to provide a method of making a coated steel wire of such strength and toughness that it can be used in commercial stitching machines to penetrate layers of thick components of metal, or other materials.

A still further object is to provide a method of making a coated steel wire of great strength, toughness and of such ductility that it can be bent flat upon itself without cracking the surface of the wire or the coating thereon.

Other objects and advantages of the invention will become apparent from the following detailed description thereof.

In practicing the invention steel having a carbon content within the range of .60 to 1.00% and a manganese content within the range of 0.20 to 1.20% is employed, the higher amounts of manganese being employed with the lower amounts of carbon. More specifically, the steel used to make the stitching wire of the present invention is that within the above ranges of carbon and manganese and having such relationship between carbon and manganese contents that with the minimum .60% carbon from .80 to 1.2% manganese is employed, and that upon an increase in the percentage of carbon over .60% the lower and upper percentage limits of such manganese range, .80 and 1.2%, respectively, are lowered in an amount which is twice the amount of the percentage increase of carbon. The sulphur content of the steel should not be over .035%, the phosphorus should be not over .030%, and the silicon content should lie between .15 and .30%.

Steel lying within the above composition ranges and manganese-carbon relationship but with the relationship of manganese to carbon somewhat narrowed is preferred in some instances. In such steel, with the minimum carbon content of .60% the manganese may vary from .90 to 1.10%, upon an increase in the amount of carbon over .60% the lower and upper percentage limits of the manganese, that is, .90 and 1.10%, respectively, are lowered in an amount which is twice the percentage increase of carbon. Steel having a carbon content of from .87 to .92% and a manganese content of from 0.25 to 0.55%, and lying within the latter narrower relationship of manganese to carbon is preferred in making the stitching wire of the present invention, but it is to be understood that the invention in its broader aspects is not limited thereto.

Steel of the composition given above, preferably deoxidized so as to eliminate segregation in the ingot and subsequent billets and rods produced therefrom, is reduced to rods and then to wire. The billets may preferably also be conditioned such as by grinding the surfaces either in spots or throughout the entire four surfaces thereof in order to remove all visible surface defects. The billets are reduced to rods by the usual rolling methods but preferably to rods not smaller than .200" in diameter. The rods are then heat treated by patenting that is heating above the critical temperature and thereafter quenching at a rate and to a temperature consistent with the carbon content of the steel. Thereupon the rods are cold worked such as by drawing, rolling, or other desired mechanical means by stages to the finished wire size. Intermediate the cold working stages the wire is further heat treated so that after all of the cold working has been completed the wire will have the required tensile strength, toughness, and ductility.

The wire which has been thus heat treated and cold worked is coated with a heavy coating which may be one of the corrosion resistant non-ferrous metals. When zinc is used as the coating metal a thickness within the range of .90 to 1.00 ounce per square foot of wire surface, that is a thickness of from .00152 to .001690 inch, is preferably applied. The wire may be thus coated either before or after all of the cold working of the wire has been completed. If the wire is to be coated by the so-called hot dip process, the coating is preferably applied before the wire has been cold worked to the finished size after which the coated wire is further cold worked to restore as much as possible of the tensile strength lost by the heat of the hot coating bath and also to smooth the surface of the coating. If the wire is to be coated by the electrodeposition process or by some other process not requiring substantially any heat in the coating operation, for example by certain extruding operations used for applying coatings of plastics or synthetic rubber or the like, such coatings may be applied after the wire has been cold worked to finished size as such coating methods will not diminish the tensile strength, toughness, and ductility of the wire. It may be preferred, however, even in the case of such coatings applied at the finished size of the wire, to give the wire a slight cold working primarily to smooth the coating as any roughness in the surface thereof may cause the coating to be stripped off, particularly when the wire is to be used for stitching metal components. While the invention is described with particular reference to round wire, it is, of course, also applicable to wires of other shapes, such as oval, part oval, triangular, square, rectangular, as well as irregular shaped wires. For stitching purposes the finished wire usually has a diameter of from .045 to .065 inch, if round, and comparable thicknesses if it is of another shape such as those given above.

As a specific illustration a method by which the stitching wire of the present invention may be made the following is given. Steel for such wire is of the preferred composition, that is, from .87 to .92% carbon, from .25 to .55% manganese, not more than .035% sulphur, not over .030% phosphorus, and from .15 to .30% silicon, for the minimum carbon content of .87% the steel containing from .35 to .55% manganese, the relationship of manganese to carbon within such ranges being the second, narrower, relationship given above. In the manufacture of wire of this composition, the steel used is deoxidized basic steel which is rolled in the form of billets, all surface defects being removed from the billets by grinding, after which the conditioned billets are hot rolled to produce rods. The steel of the above composition is a hypereutectoid steel and, therefore, the rods produced from the conditioned billets must be patented by the "Metallic Hardening process" of patenting. After being patented by the "Metallic Hardening process" of patenting, the rods are drawn three drafts to make a total of approximately 51% reduction, after which the drawn rods are patented by the "Double Lead process," and then again drawn approximately eight or nine drafts, the total reduction in such eight or nine drafts being approximately 86.5%. If the drawn wire in to be hot galvanized, it is then run through the galvanizing process after which the coated wires are given at least one draft involving a reduction of, for example, 10 to 15%, to restore any of the tensile strength that may have been lost by the heat of the galvanizing bath. If on the other hand, the finished cold drawn wire is to be coated by electrodeposition of the coated metal, no cold drawing is necessarily performed after the coating step. In this particular example the percentage of reduction of the rod in the various cold drawing steps is regulated so that the finished and coated wire will have the desired finished size or diameter of .050 inch. The "Metallic Hardening process" and the "Double Lead process" are both well known patenting methods used to obtain a sorbitic structure which combines high tensile strength with high ductility. See "The Making, Shaping, and Treating of Steel," 5th Ed., pages 1124 and 1125.

It will be understood that while the specific method set forth above is the preferred method, variations in said method may be made within the scope of this invention since it has been determined that the novel quality of this wire results primarily from its novel carbon, manganese, and sulphur contents and its heavy, corrosion resistant coating, although, of course, its processing assists greatly in securing extremely high tensile strength and toughness.

The wire produced will have a tensile strength ranging from 290,000 to 350,000 pounds per square inch and a toughness so that it will be capable of being stitched in commercial stitching machines through two layers of structural steel each layer having a thickness substantially equal to that of the wire itself. Such wires are capable of being stitched through such metal layers at a high rate of speed, such as a fraction of a second. It will also have a ductility which will permit the wire to be bent flat upon itself without cracking the surface of the wire or the coating thereon, and it will have a surface coating bonded to the wire so that the wire will withstand over 300 hours salt spray test. When a coated wire of the present invention is used to stitch metal components the wire will actually punch a clean slug out of the metal. The hole made by the wire will be a clean hole with no tearing punctures and no burrs at the edge of the hole. This wire will also be tough and ductile enough to form sharp, tight corner bends so that it will clinch flat on the underside of the component layer through which it may be stitched to provide full bearing on the material. No cracking of the surface of the wire itself will occur with its attendant notch effect that might localize high stresses under vibration. Due to the fact that the wire is of such tensile strength and toughness that it will punch a clean slug out of the metal component there will be less tendency for the coating on the surface of the wire to be scraped off. The wire of the present invention thereby presents a protected stitch in the fabricated part highly resistant to oxidation or other corrosive action due to ordinary conditions of exposure.

Although the present invention has been described in considerable detail in connection with certain specific embodiments of the method, we do not desire to be limited thereto. It will be understood that modifications and variations in the method may be resorted to without departing from the scope of the invention as defined in the following claims.

We claim:

1. A method of making coated steel wire which has a tensile strength of at least 290,000 pounds per square inch, a ductility sufficient to permit the wire to be bent flat upon itself without cracking the wire nor its coating, and a corrosion resistance sufficient to withstand over 300 hours salt spray test, and is capable of being stitched through two layers of structural steel each of a thickness substantially equal to that of the wire, comprising rolling smooth surface billets of deoxidized basic steel that consists of 0.60 to 1.00% carbon, 0.20 to 1.20% maganese, the higher percentages of manganese corresponding with the lower percentages of carbon and vice versa, 0.15 to 0.30% silicon, a maximum of 0.035% sulphur, a maximum of 0.030% phosphorus and the balance iron and incidental impurities to form rod of 0.200 inch minimum diameter, heat treating the resulting rod by patenting by a metallic hardening process, cold drawing the heat treated rod through three drafts to effect a reduction of about 51%, heat treating the drawn rods by patenting by a double lead process, cold drawing the re-heat treated rod through several drafts to effect a further total reduction of about 86.5%, coating the resulting wire, and cold drawing the coated wire through one additional draft, the final wire product having a diameter between 0.045 and 0.065.

2. A method of making coated steel wire which has a tensile strength of at least 290,000 pounds per square inch, a ductility sufficient to permit the wire to be bent flat upon itself without cracking the wire nor its coating, and a corrosion resistance sufficient to withstand over 300 hours salt spray test, and is capable of being stitched through two layers of structural steel each of a thickness substantially equal to that of the wire, comprising rolling smooth surface billets of deoxidized basic steel that consists of 0.60 to 1.00% carbon, 0.20 to 1.20% manganese, the higher percentages of manganese corresponding with the lower percentages of carbon and vice versa, 0.15 to 0.30% silicon, a maximum of 0.035% sulphur, a maximum of 0.030% phosphorus and the balance iron and incidental impurities to form rod of 0.200 inch minimum diameter, heat treating the resulting rod by patenting by a metallic hardening process, cold drawing the heat treated rod through three drafts to effect a reduction of about 51%, heat treating the drawn rods by patenting by a double lead process, cold drawing the re-heat treated rod through several drafts to effect a further total reduction of about 86.5%, coating the resulting wire, and cold drawing the coated wire through one additional draft, the final wire product having a cross-sectional area substantially equivalent to the area of a round wire having a diameter between 0.045 and 0.065 inch.

ANTONIO F. ILACQUA.
JOHN F. OCCASIONE.

REFERENCES CITED

The following references are of record in the file of this patent:

UNITED STATES PATENTS

| Number | Name | Date |
| --- | --- | --- |
| 2,118,758 | Crapo | May 24, 1938 |
| 2,317,350 | Adler et al. | Apr. 27, 1943 |

OTHER REFERENCES

"Wire Drawing and the Cold-Working of Steel," by Adam, pages 18, 24, 26, 79, 83, 88, 89, and 120. Published by H. F. and G. Witherby, London, 1925.

"The Alloys of Iron and Carbon," vol. I, by Epstein, pages 3–5, 332–335. Published by McGraw-Hill Book Co. N. Y. 1936.

"The Making, Shaping, and Treating of Steel," 5th Ed. pages 354, 1124, 1125, 1127, published by Carnegie-Illinois Steel Co. 1940.